Figure 1:
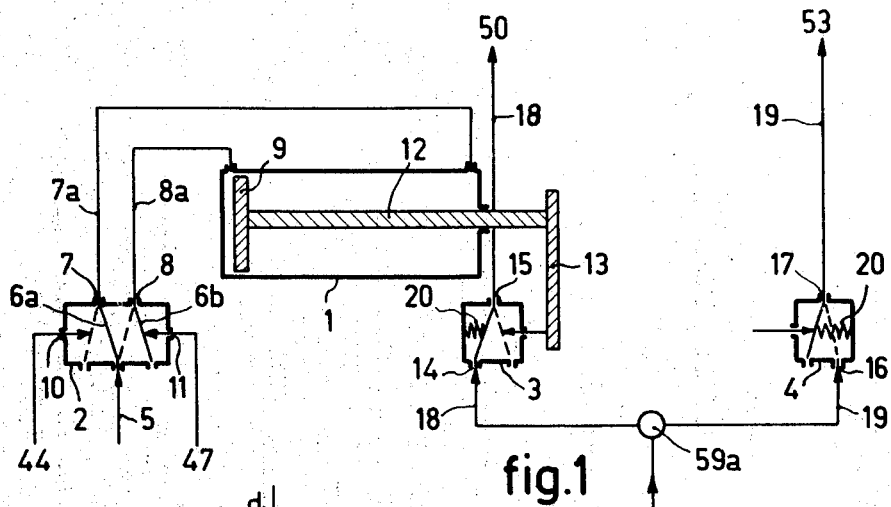

United States Patent

[11] 3,565,114

[72] Inventor Jean-Francois Andre Rousseau
    Versailles, France
[21] Appl. No. 799,619
[22] Filed Feb. 17, 1969
[45] Patented Feb. 23, 1971
[73] Assignee U. S. Philips Corporation
    New York, N.Y.
[32] Priority Feb. 16, 1968
[33] France
[31] 140,202

[54] FLUIDIC PROGRAM DEVICE FOR AUTOMATIC SEQUENTIAL CONTROL
9 Claims, 3 Drawing Figs.

[52] U.S. Cl. .................................................. 137/624.18;
    91/189; 137/81.5
[51] Int. Cl. .......................................................... F15b 21/02
[50] Field of Search ........................................... 137/624.14,
    624.18, 81.5; 91/189, 192

[56] References Cited
UNITED STATES PATENTS
2,586,623  2/1952  Detrez ......................... 91/192X
3,128,039  4/1964  Norwood ..................... 137/81.5X
3,332,443  7/1967  Mize ............................ 137/624.14

OTHER REFERENCES
Martonair Ltd.; Control Engineering; September, 1963; pages 143—145; copy in class 91, subclass 189, Group 340.

Primary Examiner—Robert G. Nilson
Attorney—Frank R. Trifari

ABSTRACT: A fluidic programming device for controlling the sequence of a cycle having successive phases. The programming device has a plurality of command connections for communicating with a device to be controlled so that a command signal may be applied to the device being controlled so as to initiate a phase. Information connections communicate between the device being controlled and the programming device to indicate when a phase is completed. Bistable switching devices receive the information from the information connections and supply fluidic command signals through the command connections. When one command signal is delivered to initiate a phase by one of the switching devices it operates to remove the command signal which initiated the preceding phase delivered by another switching device.

INVENTOR.
JEAN F. A. ROUSSEAU
BY
AGENT

FLUIDIC PROGRAM DEVICE FOR AUTOMATIC SEQUENTIAL CONTROL

The invention relates to a fluidic program device for the automatic sequential control of a cycle comprising a plurality of successive phases, which program device has a plurality of command connections through which fluidic command signals can be applied to a device to be controlled in order to initiate the various phases and is also adapted to receive fluidic information signals which are delivered by the controlled device on termination of the various phases.

Program devices of this kind are used, for example, in the automation of a machine or group of machines by which a number operations have to be performed in a prescribed sequence such as we may mention the pneumatic program device described in the article "Moving-part fluid-logic devices" by G.M. Brewin in "Industrial Electronics," Jan. 1968, pages 24—28. In the devices described the material information carrier is a punched card which is wrapped around a cylindrical drum. The drum is mounted for rotation and the presence of a hole is pneumatically detected. For this purpose, air is supplied to a number of reading tubes through restricting orifices. If no hole is punched in the program card, the reading tube is sealed and at the associated command output a pressure appears which is equal to the supply pressure. If the card contains a hole, however, the air is allowed to escape through the reading tube and the pressure at the command output falls to atmospheric pressure. The drum is rotated and hence the program is moved from row to row of holes by means of a single-acting pneumatic motor through a pawl and ratched wheel mechanism. Each incoming information signal from the automated machine or group of machines invariably acts upon the pneumatic motor, which as a result performs one complete movement and hence shifts the program one step.

A disadvantage of the said known program device is that it requires a mechanical system for stepping the material information carrier.

It is an object of the present invention to provide a fluidic program device which avoids this disadvantage, and the invention is characterized in that 1. for each command connection the program device has an information connection for receiving the said information signals, and
2. each command connection has an associated bistable fluidic switching device comprising one or more fluidic switches for delivering a command signal on reception of an information signal which indicates the termination of a given phase.

One important embodiment useful for many purposes is characterized in that each bistable switching device also serves for removing, substantially simultaneously with the delivery of a command signal, the command signal which initiated the beginning of the preceding phase. This embodiment is of particular importance when the device to be controlled contains a component part capable of performing two kinds of operations, the command signals acting either on a set input or on a reset input of a bistable control switch. If the beginning of a given phase is initiated, for example, by a command signal from the program device being applied to the set input of the said control switch, and if the beginning of another phase is to be initiated at a later instant in the cycle by a command signal being applied to the reset input, the command signal at the set input must first be removed, because otherwise the control switch will not be able to change over.

Thus, the program device in accordance with the invention ensures not only the delivery of the required command signals and the simultaneous removal of the command signal associated with the preceding phase, but also the shifting of the program, all these functions being performed by the mere use of a plurality of bistable fluidic switches. In principle, either fluidic switches having moving parts or fluidic switches having no moving parts or a combination of both kinds of fluidic switches may be used.

The operation described can simply be ensured if, according to a further embodiment, 1. each switching device has four inputs ($a_1$, $b_1$, $a_2$, $b_2$), two outputs ($c_1$, $c_2$), a set input and a reset input for effecting the relationships $b_1 \to c_1/b_2 \to c_2$ or $a_1 \to c_1/a_2 \to c_2$, respectively,
2. each command connection is coupled to one of the outputs of its associated switching device, and
3. each information connection is coupled to the set input of the next succeeding switching device, the last information connection being connected to the set input of the first switching device.

Program devices according to the latter embodiment may be designed so that under the influence of a program device the cycle of phases is continually and automatically repeated. Such a program device is obtained by using an embodiment which is characterized in that 1. in each switching device the inputs $a_1$ and $b_2$ communicate with the ambient atmosphere, the input $a_2$ is coupled to the supply connection and the output $c_1$ is coupled to the command connection associated with the switching device,
2. in each switching device except the last, the output $c_2$ is coupled to the reset input of the next succeeding switching device.
3. in each switching device except the first, the output $c_2$ is coupled to the input $b_1$ of the preceding switching device,
4. the reset input of the first switching device is coupled to the output $c_1$ of the last switching device,
5. the input $b_1$ of the last switching device is coupled to the supply connection,
6. the program device includes an additional fluidic switch having two inputs ($a$, $b$), one output ($c$), a set input for effecting the relationship $b \to c$ and a reset input for effecting the relationship $a \to c$, the input $q$ being coupled to the supply connection, the input $b$ communicating with the ambient atmosphere, the set input being coupled to the output $c_1$ of the last switching device, the reset input being coupled to the output $c_2$ of the last switching device, and the output $c$ serving to provide the direct or indirect fluidic supply to the elements of a device to be controlled which deliver fluidic information signals.

The additional switch is required to render possible the reset cycle so that during the performance of the last phase all the switching devices are reset to the position in which they wait for information. Therefore, any signals acting on the set inputs of the switching devices, must temporarily be removed, since otherwise the respective switching devices cannot switch. The arrangement further ensures that the reset signals remain at the switching devices (except the first) so that on termination of the reset cycle, when the previously removed set inputs are provided again, the respective switching devices are not switched again. From each switching device except the first, the set signal is removed only when the preceding switching element is switched by an information signal being received.

In a further embodiment of the invention, the program can be stopped on termination of an arbitrary phase; this embodiment is characterized in that the program device includes a fluidic switch for manual operation which has two inputs $a$ and $b$ and and output $c$, the input $a$ being connected to the output of the fluidic switch referred to under item 6, page 5, the input $b$ communicating with the ambient atmosphere and the output $c$ serving to provide the direct or indirect supply to the elements of the device to be controlled which deliver fluidic information signals.

An embodiment which enables the program to be stopped on termination of a cycle is characterized, in that the program device includes a fluidic switch for manual operation which has inputs $a$ and $b$ and and an output $c$ and is included in the coupling path referred to under item 4, page 5 in that its input $a$ is coupled to the output $c_1$ of the last switching device and its output $c$ is coupled to the reset input of the first switching device, its input $b$ communicating with the ambient atmosphere.

An embodiment in which, irrespective of the fact whether the program has been stopped on termination of a phase or on termination of the cycle, only one kind of starting operation is required to restart the program, is characterized in that the manual operation serves to effect the relationship $b$—$c$ and the or each switch has a reset input for fluidically effecting the relationship $a$—$c$, in that the program device includes a monostable switch for manual operation having inputs $a$ and $b$ and an output $c$, the relationship $b$—$c$ being adapted to be effected by manual operation and the relationship $a$—$c$ being normally present, whilst furthermore the input $a$ communicates with the ambient atmosphere, the input $b$ is coupled to the supply connection and the output $c$ is coupled to the reset input or inputs of the above-mentioned fluidic switch or switches for manual operation.

Obviously, the program device in accordance with the invention may be operated either by means of a gas or by means of a liquid and, in principle, between any two different pressures, which may be higher than, equal to or lower than, atmospheric pressure. Furthermore it may be used in various fields.

Figure 2:
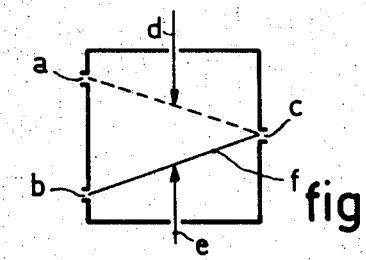
Figure 3:
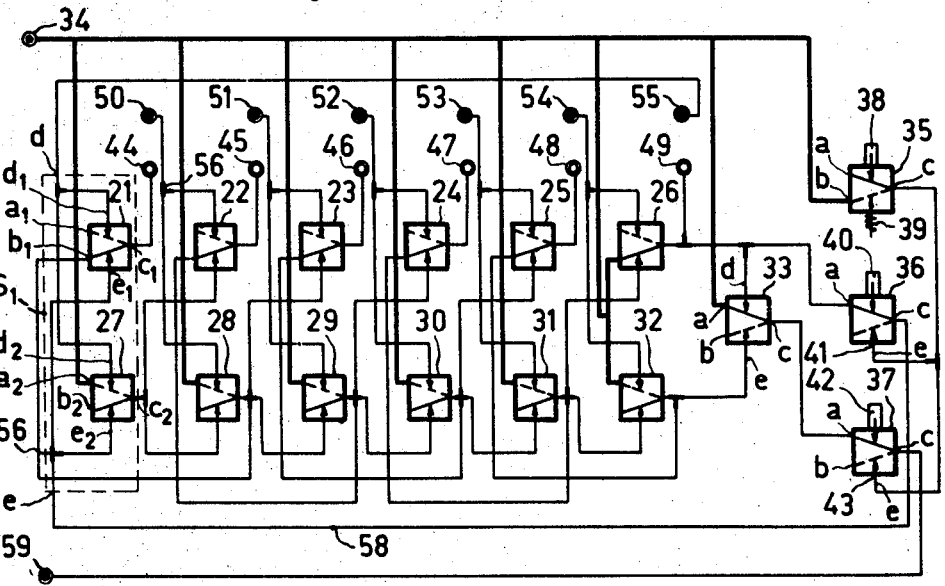

In order that the invention may readily be carried into effect, an embodiment thereof, taken from the field of pneumatic control of machine tools, will now be described by way of example with reference to the accompanying drawings, in which:

FIG. 1 shows a pneumatic shaping element adapted to be connected to a pneumatic program device in accordance with the invention, FIG. 2 shows a pneumatically operated three-way valve having two control inputs and FIG. 3 is a pneumatic program device in accordance with the invention adapted for the sequential control of six successive phases.

The shaping device shown in FIG. 1 comprises a double-acting pneumatic reciprocating motor 1, a bistable pressure-operated four-way valve 2 and two mechanically operated limit valves 3 and 4 indicating the end of the stroke of a connecting rod 12 of the engine 1.

This shaping device is capable of delivering, through its two limit valves, a pneumatic information signal indicating the extreme position reached by the motor, and of performing two different operations quite independently.

At 5 compressed air is supplied to the four-way valve 2. In accordance with the position of its switching part, shown symbolically in the form of hinged flaps $6a$ and $6b$ (drawn in solid lines in one position and in broken lines in the other position), the compressed air is supplied either to an output 7 or to an output 8 and through a duct $7a$ or $8a$ respectively to the cylinder of the motor 1 either on one side or on the other side of a piston 9 so that this piston is displaced in one of its two directions of movement.

Switching the switching part $6a$, $6b$ of the valve 2 is effected by supplying compressed air either to a control input 10 or to a control input 11, depending upon the desired direction of movement. Alternatively, the valve may comprise a single control input, a spring ensuring the movement of the part $6a$—$6b$ into its initial position in the absence of the control signal.

A stud 13 is rigidly secured to the connecting rod 12 and is capable of operating either of the limit valves 3 and 4 against the action of a respective spring 20 at the end of the stroke of the piston 9. These two limit valves are connected to compressed-air ducts 18 and 19, to which compressed air is supplied through a valve $59a$ from a source of compressed air, not shown. The valve $59a$ is controlled from a connection 59 (see FIG. 3).

In the arrangement shown in FIG. 1, the limit valve 3 is opened by the stud 13 so as to interconnect connections 14 and hence and 15. The valve 4 is in its closed position so that connections 16 and 17 are not interconnected. Obviously, both valves will be closed when the stud 13 is in a position intermediate between its two extreme positions.

The embodiment of the program device in accordance with the invention shown in FIG. 3 has 13 pneumatic valves designated by reference numerals 21 to 33. The valves are of the type shown symbolically in FIG. 2 having three-way connections $a$, $b$ and $c$ and control connections $d$ and $e$, the latter being shown symbolically by arrows. The input connections $a$ and $b$ are always isolated from one another and may each be connected to the output connection $c$ by means of a movable member shown as a hinged flap $f$. Valves operating on this principle are known and frequently have a cylindrical sliding member, for example a disc or spool, which is arranged for sliding movement in a cylinder having ports in its wall and is capable of establishing either of the said interconnections, depending on its position. Into each end of the cylinder there opens a connection $d$ or $e$ respectively through which can be supplied the pneumatic pulses for moving the disc or spool to either of its extreme positions. The spool or disc of such a valve remains in the extreme position to which it has been moved even when the last pneumatic control signal to be supplied is no longer present. Thus, the valve is bistable so that it has the possibility of acting as a store or memory.

All the valves 21 to 33 are of the type shown in FIG. 2. The valves 21 to 32 are divided into two groups, the first group comprising the valves 21 to 26 and the second group comprising the valves 27 to 32, the valve 33 being controlled by either group. Each valve of one group is associated with a valve of the other group so as to form pairs 21—27, 22—28, ...., 26—32. Each pair of valves forms a switching device. This is shown in FIG. 3 for the valves 21 and 27 which together constitute a switching device $S_1$ shown symbolically by a dashed box and having four inputs $a_1$, $b_1$, $a_2$, $b_2$, two outputs $c_1$ and $c_2$, a set input $d$ and a reset input $e$. The set input $d$ is coupled to each of the set inputs of the two valves 21 and 27, which are designated by $d_1$ and $d_2$, respectively. The corresponding reset inputs are designated by $e_1$ and $e_2$, respectively. Altogether, the arrangement shown in FIG. 3 contains six switching devices $S_1$ to $S_6$. Obviously the valves which together form a pair need not be separated from one another but may alternatively be combined to form a single composite valve.

At 34 compressed air under a pressure of between 2 and 10 bars is supplied to the program device in a nonspecified manner. From the connection 34, supply ducts shown as solid lines run to the connections $a_2$ of the valves 27—32 and also to the connection $b_1$ of the valve 26 and to the input connection $b$ of a pushbutton-operated three-way valve 35 provided with spring return. The arrangement includes three pushbutton-operated valves 35, 36 and 37, the various functions of which will be discussed thereinafter but the operation of which is similar to that of the valves 21 to 31. Each of the said three valves also has three connections designated $a$, $b$ and $c$. The moving switch part of each of these valves is displaced in one direction of movement by hand and in the opposite direction either by a spring or by a pneumatic pulse.

The valve 35 is operated in one direction by a pushbutton 38 and in the other direction by a spring 39. The valve 36 has a pushbutton 40 for manual operation and a connection 41 for operation by a pneumatic pulse, and the valve 37 has a similar pushbutton 42 and a similar connection 43. The pushbutton 38, 40 and 42 correspond to the control signal input $d$ of FIG. 2 and the spring 39 and the connection 41 and 43 correspond to the control signal input $e$.

The program device of FIG. 3 is designed for the sequential control of six successive phases. The term "phase" is used herein to mean a single movement of a shaping device or a number of simultaneous movements of several shaping devices.

In order to enable the program device to be coupled to a plurality of shaping devices, a plurality of command connections 44 to 49 are provided which each are coupled to one of the control inputs 10 and 11 of the four-way valves 2 of the shaping devices, the command signals being applied to these control inputs. In FIG. 1, it is assumed that the control inputs 10 and 11 are connected to the command connections 44 and 47, respectively.

The program device further comprises a plurality of information connections 50 to 55, through which information signals from the valves 3 and 4 of the shaping devices are applied to the control device. In FIG. 1, the outputs 15 and 17 of these valves are connected to the information connections 50 and 53. In practice, these connections may be effected by means of elements which are generally referred to as fast couplings and which each comprise a hollow plug-shaped part which is adapted to be inserted into a socketlike coupling part and is held therein by a readily disengageable locking.

The coupling parts which form the command connections 44 to 49 each have an additional element which ensures a hermetic seal when the associated coupling member is not inserted.

Each of the command connections is connected to a corresponding output $c_1$ of the valves 21 to 26.

The information connections 50 to 55 are similarly connected to the set inputs $d_1$ or $d_2$ of the valves 21 to 32, the connection 50 being connected to the valves 22 and 28, the connection 51 to the valves 23 and 29, the connection 52 to valves 24 and 30, and so on.

Thus, the set inputs $d_1$ or $d_2$ of the valves 21 to 32 receive the information through the information connections 50 to 55 which in turn are connected to the limit valves of the shaping devices. This information appears in the form of a pneumatic pulse by which the said valves are switched, the inputs $b_{1,2}$ being connected to the corresponding outputs $c_{1,2}$.

The reset inputs $e_1$ and $e_2$ of these valves receive pneumatic pulses of opposite effect, which return the valves to their initial condition in which they wait for information. They form part of a reset circuit the function of which will be described hereinafter and which connects the output $c_1$ of valve 26 through valve 36 and duct 58 to the reset inputs $e_{1,2}$ of the valves 21 and 27. This circuit is extended through the output $c_2$ of valve 27, which is connected to the reset inputs $e_{1,2}$ of the valves 22 and 28.

Similarly, the output $c_2$ of the valve 28 is connected to the reset inputs $e_{1,2}$ of the valves 23 and 29; the output $c_2$ of the valve 28 is also connected to the input $b_1$ of the valve 21. In like manner the output $c_2$ of the valve 29 is connected to the reset inputs $e_{1,2}$ of valves 24 and 30 and to the input $b_1$ of valve 22. Interconnections of this type are repeated in the same manner so as to terminate at the connection $c_2$ of the valve 31, which is connected to the reset inputs $e_{1,2}$ of valves 26 and 32 and to the input $b_1$ of the valve 24.

The valve 33, the input $a$ of which is connected to the source of compressed air, ensure the supply to the limit valves of the various shaping devices for the duration of the cycle and interrupts this supply during the time in which the valves 21 to 32 are returned to their initial positions. For this purpose, the valve 33 is controlled by the output $c_1$ of the valve 26 connected to its set input $d$ and by the output $c_2$ of the valve 32 connected to its reset input $e$. The output $c$ of the valve 33 is connected through the valve 37 to a connection 59 which serves to supply compressed air to all limit valves of all the shaping devices.

The output $c$ of the pushbutton-operated valve 35 is connected to the reset connections 41 and 43 of the valves 36 and 37.

The inputs $a_1$ of the valves 21 to 26, the input $a$ of the valve 35, the inputs $b_2$ of the valves 27 to 32 and the inputs $b$ of the valves 33, 36 and 37 communicate with the ambient atmosphere.

The operation of the program device for sequential control will now be described, assuming the first phase of a sequence comprising six phases to be just commencing. In this initial condition, all the spools of discs or the valves 21 to 32 are in the same position, i.e. the position in which the connections $a_1-c_1$ and $a_2-c_2$ have been established, which with respect to these valves corresponds to the dash-line interconnection in each valve. At the same time in valves 36 and 37 the connections $b-c$ and in valves 33 and 35 the connections $a-c$ have been established.

By depressing the pushbutton 38 of the valve 35 for a short time, the input $b$ of this valve is connected to its output $c$. As a result a pneumatic pulse is produced which is transmitted on the one hand to the control input 41 of the valve 36 so that a connection is established between the connections $a$ and $c$ of this valve (solid line) and the reset circuit used on termination of a complete shaping cycle is closed, and on the other hand to the control input 43 of the valve 37 so that in this valve also the connection $a-c$ is established (solid line). The input $a$ of the valve 37 is connected through the valve 33 to the supply of compressed air (connection 34), for the switch element of the valve 33 is in the position represented by the solid line because a control pressure is present at the reset input $e$, which control pressure is provided by the supply of compressed air and is transmitted through the path $a_2-c_2$ of the valve 32. Thus there is a pressure in the duct to the connection 59 for supplying the limit valves 3, 4 of the shaping devices. As a result, there is also a pressure at the information connection 55 which is connected to that one of the limit valves of the last shaping device in the cycle which indicated the end of the last phase.

The pressure produced at 55 causes a change in condition of the valves 21 and 27, causing the connections $b_1-c_1$ and $b_2-c_2$ to be established in these valves. Hence the input $b_1$ of the valve 21 is connected to the supply of compressed air through the valve 28 which is in the position $a_2-c_2$. As a result a command signal appears at 44, which is transmitted to the four-way valve of the shaping device connected to the command connection 44. This shaping device then performs the programmed phase and on termination of this operation the limit valve operated by the compressed-air motor delivers an information signal, which is transmitted to the information input 50 of the control device. The valve 28 is switched because the valve 27 is in the condition $b_2-c_2$ so that there is no pressure at the reset inputs $e_1$ and $e_2$ of the valves 22 and 28.

The valves 22 and 28 are switched by the information signal which appears at 50 on termination of the first shaping phase, causing the connections $b_1-c_1$ and $b_2-c_2$ to be established in these valves. Consequently, the input $b_1$ of the valve 22 is connected to the supply of compressed air through the valve 29 which still is in the condition $a_2-c_2$. A command signal appears at the command output 45, causing the second shaping device, which is connected to the connections 45 and 51, to be rendered operative. Similarly to what is the case in the first phase, on termination of the second phase an information signal appears at 51. The valve 28 had already been brought into communication with the ambient atmosphere at the beginning of the second phase and hence no longer supplies pressure to the reset inputs $c_1$ and $c_2$ of the valves 23 and 29, so that these valves are switched as soon as a pressure supplied from the information connection 51 is produced at their set inputs $d_1$ and $d_2$. As soon as the valve 28 has switched to the position $b_2-c_2$ the pressure at the connection 44 collapses because the output $c_2$ of the valve 28 is connected to the input $b_1$ of the valve 21 through which the connection 44 is supplied.

The process of the valves 23 and 29 being switched by the appearance of the information signal at the information connection 51 on termination of the second phase, initiates the beginning of a third phase by the shaping device connected between the command connections 46 and 42, causes the pressure at the reset inputs $e_1$ and $e_2$ of the valves 24 and 30 to collapse with a view to their being switched, and brings about the collapse of the pressure at the command connection 45. Thus, in the same manner the fourth and fifth phases of the cycles can be performed (valves 24 and 30, subsequently valves 25 and 31).

On termination of the fifth phase, the pressure appearing at the information connection 54 causes the valves 26 and 32 to switch. These two valves are interconnected in a manner different from that of the corresponding valves for the phases one to five because during the performance of the sixth phase it must be possible to establish the connections required to switch all the valves 22 to 33 to their initial positions. The valve 26 in its position $b_1-c_1$ causes the command connection 49 to be supplied with compressed air, enabling the sixth phase to commence. At the same time, pressure is also produced at the set connection $d$ of the valve 33, causing this valve to be switched from $d-c$ to $b-c$. Since the valve 26 has already been switched to the position $b_2-c_2$ no pressure is produced at the reset input $e$ of the valve 33 which might counteract a changeover to the position $b-c$. In the latter position, the valve 33 interrupts the supply of compressed air through the valve 37 to the connection 59 (supply to limit valves). Consequently, the information connections 50 to 55 are no longer subjected to pressure. Simultaneously, the input $a$ of the valve 36 is connected through the output $c_1$ of the valve 26 to the supply of compressed air, so that a pressure is produced in the duct 58. This pressure is transmitted to the reset inputs $e_1$ and $e_2$ of the valves 21 and 27, and causes them to be switched from the position $b_{1,2}-c_{1,2}$ to the position $a_{1,2}-c_{1,2}$. This is made possible by the absence of a pressure at the set inputs $d_1$ and $d_2$ of these valves. The changeover of the valve 27 causes the output $c_2$ of this valve to be connected to the supply of compressed air, so that the valves 22 and 28 also are switched from $b_{1,2}-c_{1,2}$ to $a_{1,2}-c_{1,2}$, for there is no longer a pressure at the information input 50. In this manner the valve pairs 23 and 29, 24 and 30, 25 and 31, and 26 and 32 are successively switched from position $b_{1,2}-c_{1,2}$ to position $a_{1,2}-c_{1,2}$. The changeover of valves 26 and 32 causes the valve 33 to be switched from $b-c$ to $a-c$, and the limit valves are again supplied with compressed air, the pressure at the input $a$ of the valve 36 and hence that in the duct 58 collapsing. This entire reset cycle takes only a fraction of a second, because the switching time of a valve is of the order of a few hundredth parts of a second. The reset cycle takes place in the time during which the sixth phase is performed and the piston of the compressed-air motor of the sixth shaping device has not yet reached an extreme position and hence does not engage the limit valve indicating the termination of the sixth phase. By the time this limit valve for delivering an information signal is engaged, it is again supplied with compressed air after having been deprived thereof during the reset cycle. Consequently, at the end of the sixth phase an information signal appears at 55 so that the valve 21 and 27 are switched from their positions $a_{1,2}-c_{1,2}$ to $b_{1,2}-c_{1,2}$ and a new shaping cycle comprising six phases commences to be performed in the same manner as that described hereinbefore.

The interruption of the supply of compressed air to the program device does not bring about any change in the sequence in which the program is carried out but the execution of the program starts where it stopped as soon as compressed air is supplied again. Once each phase has begun, it may be broken off or remain unfinished. A return to the initial condition of the program device during a cycle, which applies only to the valves which have already been switched and by these changes have caused the various phases to be executed up to the phase in which operation has been stopped and which enables the program device to be immediately returned to its initial condition, is obtainable by switching the pressure produced at the connection 59 (supply to the limit valves) to the duct 58 of the reset circuit. The valve required for this switching of the pressure during a cycle is not shown in FIG. 3.

It has been mentioned hereinbefore that the valve 35 serves to supply a pneumatic starting pulse to the valves 36 and 37 for bringing the apparatus into operation. By means of the valve 36 operation may be stopped after termination of a complete cycle. Since this valve is included in series in the reset circuit, it is sufficient to press the pushbutton at an arbitrary instant during the performance of the cycle for this reset circuit to be interrupted. From this instant, the various phases of a cycle which has been started are carried out until the last one is completed, the limit valves being normally supplied. The last phase begins when the valves 26 and 32 are switched to $b_{1,2}-c_{1,2}$ and this, as has been explained hereinbefore, causes the valve 33 to switch to the position $b-c$ so that the supply to the limit valves is interrupted. Since in this manner the reset circuit is broken by the valve 36, the valve 33 cannot return to the position $a-c$, the limit valves remain deprived of compressed air and no pneumatic pulse can appear at the information input 55 at the end of the sixth phase. Thus, the apparatus is blocked. To restart the program device, it is sufficient to produce a pneumatic starting pulse by pressing the pushbutton 38 of the valve 35, with consequent switching of the valve 36 to the position $a-c$ again.

By means of the valve 37 the program may be interrupted after the completion of any phase; this valve is connected in series in the supply circuit to the limit valves. Pressing the pushbutton 38 of the valve 35 restarts the program.

It is possible for several operations to be simultaneously performed by several shaping devices during the same phase. For this purpose the command signal which initiates the commencement of the phase is supplied through parallel ducts to the various four-way valves of the respective shaping devices. Thus, for example, the command output 47 may simultaneously be connected to the control input 10 of the four-way valve of the first machining device and to the control input 11 of the four-way valve of the third shaping device. As a result, the two pneumatic reciprocating engines of these two devices are simultaneously started. The two limit valves of these devices (the valve 3 for the first device and the valve 4 for the second device) must either be connected in series or be connected to a pneumatic logic element having an AND-function so that an information signal reaches the information connection 53 only after the movements of both shaping devices have terminated. Thus, it is quite possible for the duration of one of these movements to be considerably longer than that of the other.

Also, it is simply possible for several phases to be carried out by a single shaping device during a cycle.

If, for example, the command signals from the command outputs 44, 46 and 48 have to cause the pneumatic motor of the first shaping device to move in the direction of the limit valve 4 in three different phases, it is sufficient for these command outputs 44, 46 and 48 to be connected through a pneumatic logic element having an OR-function to the signal input 11 of the four-way valve of the first shaping device and for the output 17 of the limit valve 4 to be connected in parallel with the information connections 50, 52 and 54.

The program device of FIG. 3 may in principle be extended so as to be capable for carrying out programs of more than six phases. For this purpose it is sufficient to add one switching device for each phase to be added.

Conversely, the program device may be used for the sequential control of a cycle the number of phases of which is smaller than the number of phases of which is smaller than the number of switching devices. For this purpose it is sufficient to leave the unnecessary connections unconnected and to connect the associated information inputs to the connection 59 (supply to the limit valves).

I claim:

1. A fluidic programming device for the automatic sequential control of a cycle having successive phases to control an operating device, said programming device comprising a plurality of bistable fluidic switching devices having four inputs and two outputs and comprising at least one fluidic switch, a source of fluid pressure connected to said switching devices for operating said switching devices, a command connection associated with and connected to each of said switching devices for communicating command signals to the operating device in order to initiate the commencement of a phase, an information connection associated with each of said command connections and connected to the switching device associated with the next succeeding command connection, said information connection communicating between said operating device and the switching device connected thereto for delivering thereto a fluidic information signal from the operating device on the termination of the various phases, whereby said switching device operates to deliver a command signal to said operating device through said command connection on reception by said switching device of an information signal from said operating device which indicates the termination of a given phase, and whereby each bistable switching device operates to remove the command signal which has initiated the beginning of a preceding phase substantially simultaneously with delivery of its command signal.

2. The fluidic programming device according to claim 1 wherein said inputs of said switching device comprise a first input ($a_1$), a second input ($b_1$), a third input ($a_2$), a fourth input ($b_2$), and wherein said outputs of said switching device comprise a first output ($c_1$) and a second output ($c_2$), said bistable fluidic switching device further comprising a set input for causing said second input ($b_1$) to communicate with said first output ($c_1$) and for causing said fourth input ($b_2$) to communicate with said second output ($c_2$) when said set input receives an operating signal, and a reset input for causing said first input ($a_1$) to communicate with said first output ($c_1$) and for causing said third input ($a_2$) to communicate with said second output ($c_2$) when said reset input receives an operating signal.

3. The fluidic programming device according to claim 2 wherein each command connection is connected to its associated switching device at one of its outputs and each information connection is connected to the switching device associated with the next succeeding command connection at its set input, the last information connection of the programming device being connected to the set input of the first switching device.

4. The fluidic programming device according to claim 3 wherein said first input ($a_1$) and said fourth input ($b_2$) communicate with the ambient atmosphere, said third input ($a_2$) communicates with said source of fluid pressure, said second output ($c_2$) of each of said switching devices except the last switching device is connected with the next succeeding switching device and communicates with the reset input thereof, said second output ($c_2$) of each of said switching devices except the first switching device further communicates with said second input ($b_1$) of the preceding switching device, said reset input of the first switching device communicates with the first output ($c_1$) of the last switching device, and said second input of the last switching device communicates with said source of fluidic pressure.

5. The fluidic programming device according to claim 4 wherein said command connection is connected to and communicates with said first output ($c_1$) of its associated switching device.

6. The fluidic programming device according to claim 5 further comprising an additional fluidic switch having a first input ($a$), a second input ($b$), a single output ($c$), a set input ($d$) for causing said second input ($b$) to communicate with said output ($c$) when said set input ($d$) receives an operating signal, a reset input ($e$) for causing said first input ($a$) to communicate with said output ($c$) when said reset input ($d$) receives an operating signal, said first input ($a$) communicating with said supply of fluid pressure, said second input ($b$) communicating with the ambient atmosphere, said set input ($d$) communicating with the second output ($c_1$) of the last switching device, and the reset input ($e$) being coupled to the second output ($c_2$) of the last switching device, whereby the output ($c$) of the additional fluidic switch operates to supply operating fluid to said operating device for use in supplying information signals to said information connections.

7. The fluidic programming device according to claim 6, further comprising a first manually operable fluidic switch having a pair of inputs and an output, one of said pair of inputs communicates with the ambient atmosphere, and the other of said pair of inputs communicates with the single output ($c$) of said additional fluidic switch, manual actuation means to cause the input communicating with the atmosphere to communicate with the output of said first manually operable switch and a reset input to cause the other of the pair of inputs to communicate with the output when said reset input receives an operating signal, whereby the output of the first manually operable switch operates, to supply operating fluid to said operating device for use in supplying information signals to said information connections.

8. The fluidic programming device according to claim 7 further comprising a second manually operable fluidic switch having a pair of inputs and an output, one of said pair of inputs communicates with the ambient atmosphere, the other of said pair of inputs communicates with the first output ($c_1$) of the last switching device, the output of said second manually operable switch communicates with the reset input of the first switching device, manual actuations means for causing the input communicating with the atmosphere to communicate with the output of said second manually operable switch, and a reset input to cause the other of the pair of inputs to communicate with the output when said reset input receives an operating signal.

9. The fluidic programming device according to claim 8 further comprising a third manually operable monostable fluidic switch having a pair of inputs and an output, one of said pair of inputs communicates with the ambient atmosphere, the other of said pair of inputs communicates with said source of fluid pressure, biasing means for automatically resetting said third manually operable switch to its monostable condition in which the input communicating with the atmosphere will also communicate with the output, and manual actuation means for causing the other of said pair of inputs to communicate with the output of the third manually operable switch so that fluidic operating signals are supplied to the reset input of said first manually operable switch and to the reset input of said second manually operable switch.

PO-1050
(5/69)

UNITED STATES PATENT OFFICE
CERTIFICATE OF CORRECTION

Patent No. 3565114      Dated Feb. 23, 1971

Inventor(s) JEAN FRANCOIS ANDRE ROUSSEAU

It is certified that error appears in the above-identified patent and that said Letters Patent are hereby corrected as shown below:

Column 1, line 15, cancel "we may mention"

Column 3, line 70, cancel "and hence"

Column 7, line 42, change "$A_{1,2}-1,2$" to $--A_{1,2},-C_{1,2}--$

Signed and sealed this 20th day of November 1973.

(SEAL)
Attest:

EDWARD M. FLETCHER, JR.
Attesting Officer

RENE D. TEGTMEYER
Acting Commissioner of Patents